Patented Oct. 24, 1950

2,526,872

UNITED STATES PATENT OFFICE 2,526,872

PREPARATION OF GREEN COFFEE

William R. Johnston, Bronxville, and George W. Kirby, Yonkers, N. Y., assignors to Standard Brands Incorporated, New York, N. Y., a corporation of Delaware No Drawing. Application May 22, 1946, Serial No. 671,664

14 Claims. (Cl. 99—65)

This invention relates to processes for improving the quality of the green coffee obtainable from a given lot of coffee cherries by preventing, eliminating or minimizing fermentation of the cherry substance. It relates also to the coffee thus obtained.

There are two general methods in current use for preparing green coffee from the coffee cherry. These are usually classified as the "natural" and "washed" coffee procedures.

The natural or dry process

The ripe whole cherries are spread out on drying patios exposed to the sun and are stirred frequently to promote the evaporation of moisture. Drying may take several weeks during which period molds, yeasts, bacteria and other microorganisms grow on the cherry substance with resulting fermentation and enzymolysis by these microorganisms.

Fermentation refers to the composite action of the enzymes in the living cell of microorganisms, as for example, the action of yeast, bacteria, molds, et cetera.

Enzymolysis refers to chemical or physical changes in any part of the coffee cherry induced by enzymes which may be the natural coffee cherry enzymes or those produced by microorganisms growing on the cherry substance.

When the cherries have been dehydrated to less than 20% moisture, they are passed through a mulling machine to remove all of the substance exterior to the green bean. The finished green coffee is called "natural" or "dry process" coffee.

A variation of this procedure is the method of permitting the cherries to approach dryness on the tree, and then finishing the drying on the patios. This procedure likewise permits the growth of microorganisms and therefore involves fermentation and enzymolysis of the cherry substance.

The washed or wet process

The ripe whole cherries are washed and passed through a pulping machine to remove the skin and most of the mucilaginous pulp. The resulting so-called pulped beans are held in fermentation tanks where spontaneous fermentation is allowed to take place until the residual mucilage can be washed from the parchment integument which encases each green bean. The washed beans in parchment are dried in the sun or in a mechanical dryer. The parchment is removed in a shelling machine and the clean green coffee is termed "washed" or "wet process" coffee.

It is clear from the foregoing that the green coffee of commerce, whether it is natural or washed coffee, is subjected to fermentation and accompanying enzymolysis during the preparative period. In fact, it is a generally held opinion in the coffee trade that fermentation as practiced in the "wet process" is necessary for the proper development of coffee flavor. In this connection, it should be noted that washed coffee is generally definitely superior in quality to natural coffee.

In the present invention it has been established by controlled experimentation that fermentation is not only unnecessary for the production of quality coffee but frequently has a deleterious effect. If the fermentation process is mild, of a suitable type and of short duration good washed coffee can be produced in spite of, not because of, the fermentation step employed. It appears that often fermentation produces acids and other objectionable substances which are absorbed by the green coffee bean with resultant poor quality. Coffee beans from any given region have an inherent quality which is best preserved by preventing fermentation during the preparation of finished green coffee. Accordingly, the present invention is concerned with the retention of the inherent quality of the coffee grown in a given region. No development of flavor is contemplated. Biochemical changes characteristic of present commercial methods of preparing green coffee are eliminated or minimized.

According to the invention, the skin, pulp and parchment of coffee cherries are removed from the bean in a substantially non-fermented state. This may be accomplished for example by taking whole cherries or the pulped beans in a substantially non-fermented state and drying the same while avoiding substantial fermentation. The time which elapses between the picking of the ripe coffee cherry and the obtention of the finished green coffee is preferably cut to a minimum, that is, the processing operations are started as soon as possible after picking and are completed in as short a time as possible. In such case enzymolysis by enzymes naturally present in the cherry substance is largely avoided or retarded.

The drying operation may, however, be delayed for many hours after picking the cherries so long as substantial fermentation has not set in. If desired, fermentation may be avoided by resort to refrigeration or other means.

While the invention contemplates rapid drying of the whole coffee cherry, it is more economical to remove the skin and pulp adhering thereto from the cherries before drying, for example, in the pulping machines commonly used in the preparation of coffee for the wet process described above, and thus reduce the amount of substance to be dehydrated. The dehydration may be continued until the beans themselves are dry, whereupon the dried pulp and parchment coating are separated in a shelling machine to yield finished green coffee. If desired the drying operation may be interrupted when the cherry substance exterior to the beans including the parchment is dry or has been dehydrated sufficiently so as to be brittle and readily removable by mechanical means, as for instance, in a shelling machine. The latter procedure is preferable because removal of the dry shell on the beans facilitates completion of the drying operation.

Any suitable drying apparatus may be used, as for instance, shelf or drum driers operated with heated air or in vacuo. The drying rate is preferably the highest obtainable without injury to the beans by overheating. With proper temperature control pulped beans may be successfully dried in three or four hours or less and brought to a condition where they are ready for commerce. In a small fraction of this time the pulp and parchment can be dehydrated sufficiently so that they can be separated from the bean in a shelling machine, whereupon the clean beans can be dried with expenditure of less energy than would be required otherwise. At a high drying rate fermentation can be inhibited in the pulp and parchment within a few minutes.

If the coffee with adhering pulp has undergone some fermentation, for instance, where much time has elapsed between the picking of the cherry and the start of the pulping or drying operation, it has been found advantageous to subject the same to blanching for a time and at a temperature sufficient to terminate fermentation throughout the cherry substance, thereby preventing further deterioration in the quality of the coffee. Blanching may be used also to destroy or inactivate fermentation organisms on the cherry substance, in cases where fermentation has not actually set in but where delays in processing are expected and it is desired to preserve the cherry substance for a relatively long time in a non-fermented state.

Blanching may be accomplished by means of hot or boiling water or steam. Blanching should be just sufficient to inhibit fermentation throughout the cherry substance including the bean itself without deleterious modification of bean structure which would result from extended heating. It is not necessary or desirable to inhibit or destroy the enzymes in the coffee bean. The desirable extent of blanching depends upon the type of coffee bean and the degree of biochemical change which has occurred prior to or after pulping. Freshly picked, soft bean coffee may be injured by blanching for more than a few seconds in boiling water. Hard bean coffee may be left in boiling water for several minutes with good results, particularly in the case of overfermented or severely enzymolysed beans which are improved because blanching terminates these biochemical reactions and to some extent eliminates, possibly by solution and volatilization, the undesirable products of the biochemical reactions which have been absorbed by the beans.

The invention is illustrated by the following examples:

*Example 1.*—A batch of ripe Haitian coffee cherries were refrigerated promptly after picking and kept at a temperature of approximately 35° F. until they could be pulped approximately 72 hours later. The substantially unfermented pulped beans were divided into three batches which were processed as follows:

A. *Regular washed coffee process*

The pulped beans were fermented for 22 hours, then washed, dried, and shelled.

B. *Physical processing without blanching*

The pulped beans were dried immediately after pulping, then shelled.

C. *Physical processing with blanching*

The pulped beans were blanched in boiling water for 10 seconds, dried immediately after blanching, then shelled.

All samples were dried in a shelf drier in an air stream flowing at approximately 10 cubic feet per minute per pound of pulped beans. The temperature of the air stream was 160° F. during the first hour, 120° F. during the next 15 hours (overnight) and 160° F. during the next 4 hours.

Expert evaluation of these samples after roasting showed the two physically processed samples to be distinctly better in quality than the washed coffee which was characterized as having an objectionable sour flavor. Of the two physically processed samples, the unblanched sample was rated slightly better than the blanched lot. It was noted that the physically processed samples are distinctly different in green and roasted appearance, relative to washed or natural coffees. The blanched coffee is blue-green in appearance, and the unblanched physically processed coffee is gray-green to blue-green, in contrast to the yellowish green, green, or greenish-blue commercial coffees. Both new types yield a cleaner and brighter roasted bean than the average natural or washed coffee. Both types yield a ground coffee relatively free from chaff and definitely better in appearance than present commercial coffees. The roasted blanched coffee is more of a chocolate brown than a normal coffee brown.

*Example 2.*—A batch of ripe Brazilian coffee cherries was pulped within a few hours after picking before fermentation had set in and the pulped beans were divided into three batches which were processed immediately as in Example 1, each sample being dried in a shelf drier in an air stream whose temperature was kept at 175° F. for 4 hours and then at 165° F. for 8 hours. Substantially the same results were obtained.

Many experiments on Haitian, Cuban and Brazilian coffee have confirmed these typical differences between washed coffee and coffee processed by the present invention.

It is to be understood that the foregoing examples are given for the purpose of illustration only and that the invention is not to be limited except as indicated in the appended claims.

We claim:

1. A process of preparing green coffee from coffee cherries which comprises drying the cherries or pulped beans without injury to the beans and then removing the dried shell from the beans, the cherry substance being maintained throughout the process in a substantially non-fermented state.

2. A process of preparing green coffee from coffee cherries which comprises removing the skin and most of the pulp of the cherries, drying the resulting pulped beans without injury to the beans and removing the dried shell from the beans, the cherry substance being maintained throughout the process in a substantially non-fermented state.

3. A process of preparing green coffee from coffee cherries which comprises removing the skin and most of the pulp of the cherries, drying the resulting pulped beans, separating the dried pulp and parchment and further drying the cleaned beans, the cherry substance being maintained throughout the process in a substantially non-ferementated state and the drying operations being carried out without injury to the beans.

4. A process of preparing green coffee from coffee cherries which comprises drying the cherry substance exterior to the bean, removing said dry substance from the beans and then drying the clean beans, the cherry substance being maintained throughout the process in a substantially non-fermented state and the drying operations being carried out without injury to the beans.

5. A process as claimed in claim 2 wherein the drying is carried out in a stream of heated air.

6. A process as claimed in claim 3 wherein the drying is carried out in a stream of heated air.

7. A process as claimed in claim 4 wherein the drying is carried out in a stream of heated air.

8. A process as claimed in claim 2 wherein the drying is carried out in vacuo.

9. A process as claimed in claim 3 wherein the drying is carried out in vacuo.

10. A process as claimed in claim 4 wherein the drying is carried out in vacuo.

11. A process of preparing green coffee from coffee cherries which comprises removing the skin and most of the pulp of the cherries within a few hours of picking, promptly and rapidly drying the pulped beans in a stream of hot air without injury to the beans and then removing the dried shell from the beans.

12. A process as claimed in claim 2 wherein the pulped beans are blanched prior to drying to inhibit fermentation in the cherry substance.

13. A process as claimed in claim 4 wherein the coffee cherries are blanched prior to drying to inhibit fermentation in the cherry substance.

14. A process of preparing green coffee from coffee cherries which comprises blanching fermented cherries or fermented pulped beans for a time and at a temperature sufficient to terminate fermentation in the cherry substance but insufficient to modify the bean structure, drying the blanched beans at least until the pulp and parchment are dry before substantial fermentation can take place therein and then removing the dried shell from the beans.

WILLIAM R. JOHNSTON.
GEORGE W. KIRBY.

REFERENCES CITED

The following references are of record in the file of this patent:

UNITED STATES PATENTS

| Number | Name | Date |
|---|---|---|
| 251,133 | Philips | Dec. 20, 1881 |
| 1,038,032 | Urgelles | Sept. 10, 1917 |
| 1,496,932 | Gross | June 10, 1924 |
| 1,737,071 | Birnie | Nov. 26, 1929 |

OTHER REFERENCES

Prescott et al., "Food Technology," pages 582–583, McGraw-Hill Book Company Inc., N. Y., 1937,